Oct. 8, 1935.    S. DOWINSKY    2,016,961
PRESSING IRON STEAM GENERATOR
Filed Nov. 20, 1934
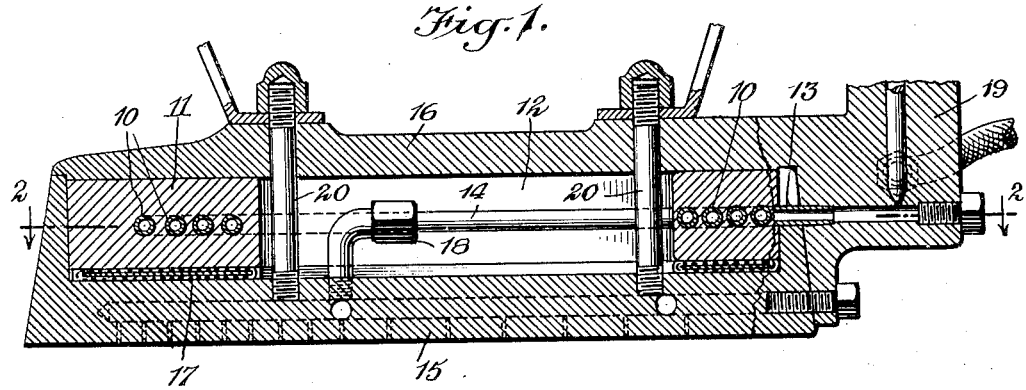
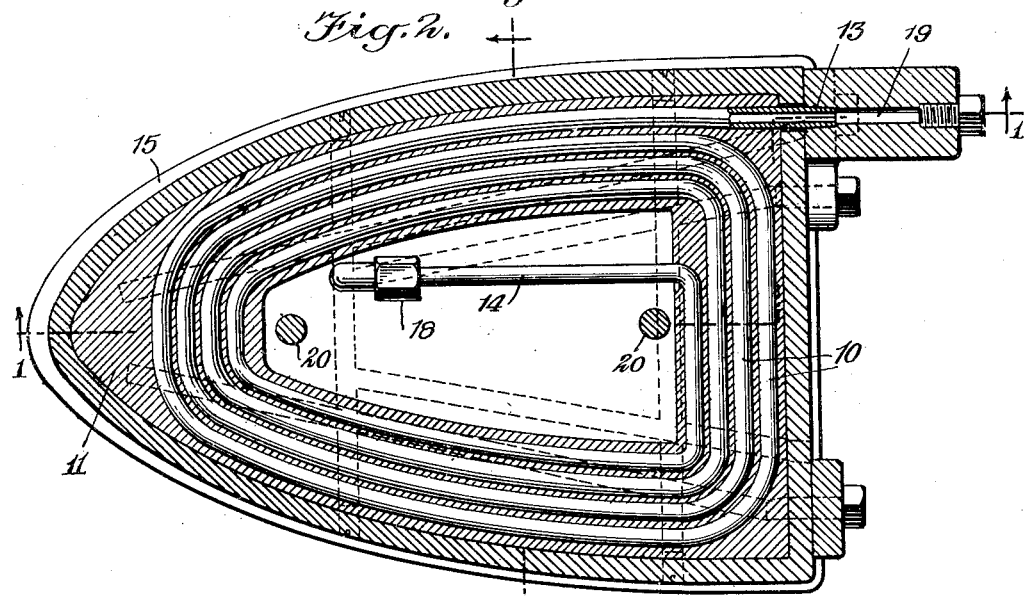
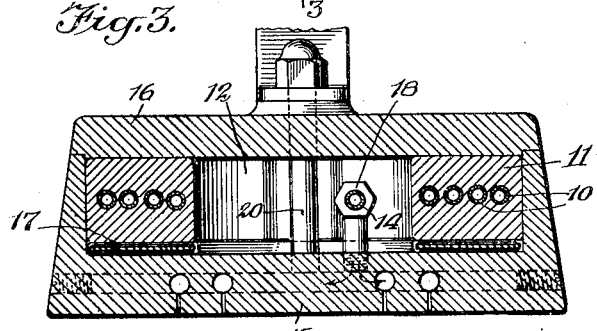
WITNESSES
INVENTOR
Samuel Dowinsky
BY
ATTORNEYS Patented Oct. 8, 1935

2,016,961

UNITED STATES PATENT OFFICE 2,016,961

PRESSING IRON STEAM GENERATOR

Samuel Dowinsky, New York, N. Y.

Application November 20, 1934, Serial No. 753,933

2 Claims. (Cl. 257—263)

This invention relates to a unit for use in a sad iron or pressing iron for generating steam therein which is caused to issue from ducts in the pressing face of the iron.

The principal object of the invention is the provision of a unit of the indicated character constituting a structural integrality affording an intimate metallic contact between a suitable body and a pipe or tubing, so as to obtain a maximum steam generating efficiency.

The advantages of the use of a unit of the character mentioned are the low cost of production, and the low cost of incorporating the unit in the iron.

The nature of the invention and its distinguishing features and advantages will appear when the following specification is read in connection with the accompanying drawing in which Fig. 1 is a longitudinal section showing a unit embodying the invention in use in a pressing iron portions of which are broken away, the section being taken approximately on the line 1—1 of Fig. 2;

Fig. 2 is a section taken on the line 2—2 of Fig. 1;

Fig. 3 is a section taken on the line 3—3 of Fig. 2.

The unit of the present invention includes a single piece of piping or tubing 10 of any suitable metal, preferably copper. The pipe or tubing 10 may be bent into any desirable form or shape so as to provide a maximum heating surface in a comparatively small area. The pipe or tubing 10 may be bent zig-zag, or be looped as shown in the present instance. It is also to be understood that the pipe or tubing 10 may be so bent or coiled as to produce two or more layers superposed with respect to each other. In the present instance there is shown by way of example a one-layer coil. In accordance with the invention use is made of a mass of suitable molten metal, preferably aluminum or white metal, which is cast about the pipe or tubing 10 so as to be in intimate contact therewith, and to form a solid body. This body is designated 11. The body 11 may take any desired shape, but is preferably the shape of the usual sadiron or pressing iron having a straight rear end, and sides converging to a point at the front, shown most clearly in Fig. 2.

In producing the unit, the pipe or tubing bent to the desired form will be placed in a suitable mold after which the selected molten metal is poured into the mold for the purpose of casting the metal about and in intimate contact with the pipe or tubing, and to form a solid body. In the present instance the upper and lower surfaces of the body 11 are flat and parallel to each other. The body 11 also has an opening 12 therein which is within the confines of the innermost coil of the pipe or tubing 10, in order to accommodate suitable fastening elements for the purpose of securing the unit in place. The opposite ends of the pipe or tubing 10 are left available to provide for the inlet of water to the pipe or tubing, and to provide for the outlet of steam therefrom. In the present instance the opposite ends of the pipe or tubing project from the cast body 11 at different points and in different directions. One end 13, the inlet end, projects rearwardly at one side of the body 11, and the other end 14, the outlet end, projects forwardly into the opening 12.

The unit having the features set forth is designed and adapted to be arranged between a bottom or pressing section 15 and a top or cover section 16 of a pressing iron, as shown in Fig. 1. The section 15 has a recess therein in which the unit fits. Heat is produced by an electric heater unit 17 arranged between the section 15 and the body 11. The outlet end 14 of the pipe or tubing 10 is in communication with a bore of a plurality of inter-communicating bores in the section 15, by a coupling 18. Certain of the bores have ducts leading therefrom through the pressing face of the section 15 to liberate the steam, all of which is common practice. The inlet end 13 of the pipe or tubing 10 has connected therewith controllable water feeding means of any preferred type, the same being designated generally by the reference numeral 19. The sections 15 and 16 together with the heater and steam generating unit are fastened together by bolts 20 carried by the section 15 and extending through the opening 12 in the body 11 and passing through holes in the section 16, nuts being applied to these bolts 20 which also serve to secure the usual handle of the iron.

From the foregoing it will be obvious that water is fed to the pipe or tubing 10 through the inlet end 13 thereof, which is converted into steam by the heat produced by the heater 17, finding its way to the pipe or tubing 10 by conduction through the body 11 which is in intimate contact with the pipe or tubing 10. The steam passes from the outlet end 14 of the pipe or tubing 10 to the pressing face of the iron through the communicating bores and ducts hereinbefore mentioned.

I claim:

1. For use in generating steam in a pressing iron, a metal pipe, and a mass of metal cast about and in intimate contact with the pipe, and forming a solid body having an opening therethrough, the opposite ends of the pipe projecting from said body, one of said ends serving for receiving water and the other end projecting into said opening and serving for delivering steam.

2. For use in delivering steam in a pressing iron, a coiled metal pipe, and a mass of metal cast about and in intimate contact with the pipe and forming a solid body having an opening therethrough within the confines of the coil of the pipe, the opposite ends of the pipe projecting from said body, one of said ends providing an inlet and the other end projecting into said opening and providing an outlet.

SAMUEL DOWINSKY.